United States Patent
Le Metayer (10) Patent No.: US 10,399,267 B2
(45) Date of Patent: Sep. 3, 2019

(54) DEVICE FOR THERMOFORMING CONTAINERS HAVING TRANSLATIONAL MOULD BLOCKS

(71) Applicant: ERCA, Les Ulis (FR)

(72) Inventor: Sébastien Le Metayer, Saint Germain le Vasson (FR)

(73) Assignee: ERCA, Les Ulis (FR)

( * ) Notice: Subject to any disclaimer, the term of this patent is extended or adjusted under 35 U.S.C. 154(b) by 238 days.

(21) Appl. No.: 15/686,249

(22) Filed: Aug. 25, 2017

(65) Prior Publication Data
US 2017/0348897 A1    Dec. 7, 2017

Related U.S. Application Data

(63) Continuation of application No. PCT/FR2016/050386, filed on Feb. 19, 2016.

(30) Foreign Application Priority Data

Feb. 27, 2015 (FR) ..................... 15 51678

(51) Int. Cl.
*B29C 51/16* (2006.01)
*B29C 51/12* (2006.01)
*B29C 51/20* (2006.01)
*B29L 31/00* (2006.01)

(52) U.S. Cl.
CPC ............ *B29C 51/167* (2013.01); *B29C 51/12* (2013.01); *B29C 51/162* (2013.01); *B29C 51/20* (2013.01); *B29L 2031/7132* (2013.01)

(58) Field of Classification Search
CPC ........ B29C 51/12; B29C 51/16; B29C 51/162; B29C 51/165; B29C 51/167; B29C 49/2408

See application file for complete search history.

(56) References Cited

U.S. PATENT DOCUMENTS 4,804,322 A * 2/1989 Turtschan .............. B29C 51/167
425/117

FOREIGN PATENT DOCUMENTS

| DE | 10 2004 023582 A1 | 12/2005 | | |
| --- | --- | --- | --- | --- |
| EP | 1 090 735 A2 | 4/2001 | | |
| EP | 1604803 A1 | * 12/2005 | ........... | B29C 51/165 |
| FR | 2858263 A1 | * 2/2005 | ........... | B29C 51/165 |
| FR | 2911537 A1 | * 7/2008 | ........... | B29C 51/165 |
| GB | 2322093 A | * 8/1998 | ........... | B29C 51/167 |

OTHER PUBLICATIONS

International Search Report dated May 25, 2016.

* cited by examiner

*Primary Examiner* — William P Bell
(74) *Attorney, Agent, or Firm* — Eversheds Sutherland (US) LLP (57) ABSTRACT

A device for thermoforming containers, the device having mold blocks mounted to move in translation. An example embodiment may include at least first and second analogous mold blocks, a counter-mold, means for causing a thermoplastic material to advance along an advance axis, and two labeling blocks. The mold blocks can be moved in a first movement between a thermoforming level and a disengagement level. The mold blocks can also be moved in a second movement along an axis transverse to the advance axis so as to place each mold facing in succession the counter-mold and one of the labeling blocks.

20 Claims, 8 Drawing Sheets

DEVICE FOR THERMOFORMING CONTAINERS HAVING TRANSLATIONAL MOULD BLOCKS

CROSS-REFERENCE TO RELATED APPLICATIONS

This application is a continuation of International Application No. PCT/FR2016/050386, filed Feb. 19, 2016, which claims priority to French patent application 1551678, filed Feb. 27, 2015, both of which are incorporated by reference.

The present invention relates to a device and a method for manufacturing, by thermoforming, containers provided with decorative labels.

Patent Application EP 1 090 735 discloses a device and a method for thermoforming containers from a band of thermoplastic material that is advanced stepwise. That device comprises two mold blocks, one counter-mold, and two label insertion blocks for inserting decorative wrap-around labels or "banderoles". The two mold blocks are mounted to move vertically between a thermoforming level and a disengagement level, and they are also mounted to move horizontally along the advance axis of the band of thermoplastic material in such a manner that one mold block is in the thermoforming position, below the counter-mold, while the other is in a decoration position under a decorative wrap-around label insertion block. The decorative wrap-around label insertion blocks are mounted to move transversely to the advance axis of the band so as to be disengaged from the band in such a manner as to enable decorative wrap-around labels to be put in place in said blocks, and so as to be brought back under the band, facing the thermoforming chambers of the mold in the decoration position in such a manner as to insert the decorative wrap-around labels into the chambers of said mold block.

During the thermoforming, the mold block in the thermoforming position is at the thermoforming level, while the other mold block, which is in the decoration position, is at the disengagement level. That device operates as follows:

containers are thermoformed in the first mold block in the thermoforming position at the thermoforming level, and decorative wrap-around labels are placed in the second mold block in the decoration position at the disengagement level, by the second wrap-around label insertion block that is then under the thermoplastic band while the first decorative wrap-around label insertion block is spaced apart from it;

the first mold block is brought to the disengagement level;

the two mold blocks that are then at the disengagement level are moved so as to place the second mold block in the thermoforming position, and so as to place the first mold block in the decoration position;

the second decorative wrap-around label insertion block is moved apart from the band, and the first decorative wrap-around label insertion block is brought back under the band; and the second mold block is raised to the thermoforming level to thermoform containers at that level, while decorative wrap-around labels are also being placed in the first mold block by the first decorative wrap-around label insertion block, which is then under the thermoplastic band while the second insertion block is spaced apart from it.

The movements are therefore complicated and the disengagement level must be far enough away from the thermoforming level not only to enable the containers thermoformed in one of the mold blocks to be demolded, but also to enable decorative wrap-around labels to be inserted into the mold block while taking into account the overall size of the decorative wrap-around label insertion block used to insert the wrap-around labels into said other mold block.

Patent Application EP 1 836 040 also discloses a device and a method for thermoforming containers from a band of thermoplastic material, using a rotary mold set comprising a plurality of mold blocks that, in succession, take up a position in which they extend vertically to enable the container to be thermoformed, and a position in which they extend laterally to enable labels to be put in place in the thermoforming chambers, and one or more label insertion blocks for inserting labels into the mold blocks. That system is satisfactory in that it enables high production throughput rates to be achieved. However, since it is necessary to drive the mold set in rotation in addition to moving it vertically to enable the containers to be thermoformed and demolded, that device requires a relatively complex structure. In addition, the insertion blocks need to be specially designed to enable the labels to be put in place when the mold blocks are in the positions in which they extend laterally, which can make the structure of the label insertion blocks more complex. Finally, the insertion blocks are necessarily placed under the advance plane of the band of thermoplastic material and, in particular, under the heater station, which makes them difficult to access, limits their size and makes them more complex to maintain.

An object of the invention is to provide a device whose movements are simple and that makes it possible to achieve high production throughput rates, while also being compatible with conventional labeling blocks.

The invention thus provides a device for manufacturing, by thermoforming, containers provided with decorative labels, the device comprising:

a mold device comprising at least first and second analogous mold blocks;

a counter-mold, a thermoplastic material being caused to advance along an advance axis and to face the counter-mold in a thermoforming plane defined by the advance axis and by a transverse axis; and two labeling blocks;

the mold device being placed on the other side of the thermoforming plane relative to the counter-mold, and being configured so that the mold blocks can, in succession, take up a first configuration in which the first mold block is in a thermoforming position facing the counter-mold while the second mold block is in a labeling position facing one of the labeling blocks, and a second configuration in which the second mold block is in the thermoforming position, while the first mold block is in a labeling position facing the other of the labeling blocks;

the labeling blocks being disposed on either side of the counter-mold along the transverse axis;

the first and second mold blocks forming a set suitable for being moved in a first movement perpendicularly to the thermoforming plane between a thermoforming level close to said plane and a disengagement level spaced apart from said plane, and in a second movement along the transverse axis so as to place the mold blocks facing in succession the counter-mold and one of the labeling blocks.

The movements of the mold device are simple, since it is merely moved as a whole between the thermoforming level and the disengagement level, which makes it possible, in particular, for the containers to be demolded, and since the first and second mold blocks are also moved as a whole in the second movement so as to place said mold blocks facing in succession the counter-mold and one of the labeling blocks. In addition, the mold blocks extend in the same directions for labeling and for thermoforming, which makes it possible to use conventional labeling blocks, wherein the labels, and in particular the decorative wrap-around label bands from which said labels are formed, are brought into place in an ordinary manner. Finally, in the labeling position, the mold blocks are spaced apart from the advance path along which the thermoplastic material advances, and they therefore do not interfere with the various container manufacturing stations, thereby avoiding problems of limited space, and simplifying maintenance of them.

Optionally, the mold device further comprises third and fourth analogous mold blocks forming a set parallel to the set formed by the first and second mold blocks, the counter-mold has two parallel counter-mold portions, each of which corresponds to a mold block, and the first, second, third, and fourth mold blocks are suitable for being moved together in the first movement and for being moved simultaneously during the second movement, said second movement being made in opposite directions for the set formed by the first and second mold blocks and for the set formed by the third and fourth mold blocks.

The production throughput rates are then increased because the containers are thermoformed simultaneously in two mold blocks, and the labels are put in place simultaneously in two mold blocks. The movements remain simple, since all four mold blocks are moved together between the thermoforming level and the disengagement level, while the two sets respectively comprising the first and second mold blocks and the third and fourth mold blocks are merely moved in translation, back and forth.

Optionally, the labeling blocks are suitable for being moved in a third movement parallel to the advance axis in synchronization with the movements of the mold blocks, in such a manner as to be alternately in alignment with the first counter-mold portion and in alignment with the second counter-mold portion.

The third movement is merely a movement in translation that is easy to implement. It can easily be synchronized with the other movements and with the operations of thermoforming and of putting the labels in place.

Optionally, when the mold blocks are in the first configuration, the first mold block is in the thermoforming position facing the first counter-mold portion, the second mold block is in the labeling position facing the first labeling block, the third mold block is in the thermoforming position facing the second counter-mold portion and the fourth mold block is in the labeling position facing the second labeling block, while, when the mold blocks are in the second configuration, the first mold block is in the labeling position facing the second labeling block, the second mold block is in the thermoforming position facing the first counter-mold portion, the third mold block is in the labeling position facing the first labeling block, and the fourth mold block is in the thermoforming position facing the second counter-mold portion.

Thus, the thermoforming in two mold blocks can take place while the labeling is taking place in two other mold blocks, thereby saving time.

Optionally, the device is configured to move the labeling blocks in the third movement during the first movement of the mold blocks from the thermoforming level to the disengagement level.

Thus, the labeling blocks are moved after a thermoforming operation, while the mold blocks are being moved towards the disengagement level, i.e. the time taken to move the mold blocks is put to advantageous use for moving the labeling blocks, and the labeling blocks are already in the waiting position when the mold blocks return to the thermoforming level, for performing the labeling in the mold blocks that have just been used for the thermoforming and that are then facing the labeling blocks in the waiting position.

Optionally, each mold block has two rows of thermoforming chambers extending along the transverse axis, and each labeling block has two corresponding rows of zones for putting labels in place.

Thus, each label block brings the labels from its zones for putting labels in place to the thermoforming chambers in register with said zones, and in particular facing said zones, so that the label can be brought into place in a simple manner.

Optionally the device further comprises a common support mounted to move in translation perpendicularly to the thermoforming plane, the mold blocks being carried by the common support in a manner allowing said blocks to be caused to slide along the transverse axis.

Optionally: each labeling block comprises label preparation and cutting zones for receiving labels cut off from strips brought into said zones; for each strip, the device further comprises at least one drive pulley for bringing the end of the strip into a label preparation and cutting zone, and at least one tension pulley for putting the strip under tension; and the device is configured so that, while the labeling block is moving in the third movement, the drive pulley moves with the labeling block, and the tension pulley and the drive pulley move relative to each other.

Optionally, the tension pulley co-operates with a cam.

The invention also provides a method of manufacturing, by thermoforming, containers provided with decorative labels, the method comprising the following steps:

causing a thermoplastic material to advance along an advance axis, and bringing the thermoplastic material to face a counter-mold in a thermoforming plane defined by the advance axis and by a transverse axis;

causing two analogous mold blocks of a mold device placed on the other side of the thermoforming plane relative to the counter-mold to be placed, in succession, in a first configuration in which the first mold block is in a thermoforming position facing the counter-mold while the second mold block is in a labeling position facing a labeling block, and in a second configuration in which the second mold block is in the thermoforming position, while the first mold block is in a labeling position facing another labeling block;

the labeling blocks being disposed on either side of the counter-mold along the transverse axis, going from one of the first and second configurations to the other is achieved by moving the first and second mold blocks together in a first movement perpendicularly to the thermoforming plane between a thermoforming level close to said plane and a disengagement level spaced apart from said plane, and in a second movement along the transverse axis so as to place the mold blocks facing in succession the counter-mold and one of the labeling blocks.

As indicated above, with reference to the device of the invention, the method makes it possible to achieve high throughput rates, with movements for moving the mold blocks that are simple, the first and second mold blocks being moved together between the thermoforming level and the disengagement level, and also being moved together in the second movement. In addition, the mold blocks extend along the same axes for the thermoforming and for the labeling, which makes it possible to use labeling blocks that are of conventional configuration. In addition, the labeling blocks can be offset from the advance path along which the thermoplastic material advances.

Optionally, with the counter-mold having two counter-mold portions, each of which corresponds to a respective mold block, the first movement is made by moving the first and second mold blocks together with third and fourth analogous mold blocks to bring all four mold blocks together to the thermoforming level or to the disengagement level, and the second movement is made by moving the first and second mold blocks together in one direction and by moving the third and fourth mold blocks together in the opposite direction.

Optionally, the labeling blocks are moved in a third movement parallel to the advance axis, so that each labeling block finds itself, in succession, in alignment with one or the other of the counter-mold portions.

Optionally, when the mold blocks are in the first configuration, containers are thermoformed in the first and third mold blocks in the thermoforming position facing respective ones of the first and second counter-mold portions, and labels are put in place in the second and fourth mold blocks facing respective ones of the first and second labeling blocks, while, when the mold blocks are in the second configuration, containers are thermoformed in the second and fourth mold blocks in the thermoforming position facing respective ones of the first and second counter-mold portions, and labels are put in place in the first and third mold blocks facing respective ones of the second and first labeling blocks.

Optionally, labels are put in place in the mold blocks situated facing the labeling blocks at the same time as the thermoforming is being performed in the mold blocks situated facing the counter-mold while all four mold blocks are at the thermoforming level, and the labeling blocks are moved in the third movement while the four mold blocks are being moved in the first movement, from the thermoforming level towards the disengagement level.

Optionally, with each mold block having two rows of thermoforming chambers extending along the transverse axis, and with each labeling block having two corresponding rows of label preparation zones, the thermoforming of the containers in the chambers of the mold blocks situated facing the counter-mold is performed simultaneously with putting labels in place in the chambers of the mold blocks situated facing the label preparation zones, while the four mold blocks are at the thermoforming level.

Optionally, the ends of strips are brought to and cut off in label preparation and cutting zones of the labeling blocks so as to form labels in said zones, and, while the labeling blocks are moving in the third movement, the tension of the strips is maintained by means of tension pulleys that are moved relative to said blocks.

Optionally, the ends of the strips are brought to the label preparation and cutting zones of each labeling block by using, for each strip, at least one drive pulley and at least one tension pulley, and, while the labeling block is being moved in the third movement, the drive pulley and the tension pulley are moved relative to each other.

The invention can be well understood and its advantages appear more clearly on reading the following detailed description of an embodiment that is shown by way of non-limiting example. The description refers to the accompanying drawings, in which.

Figure 1:
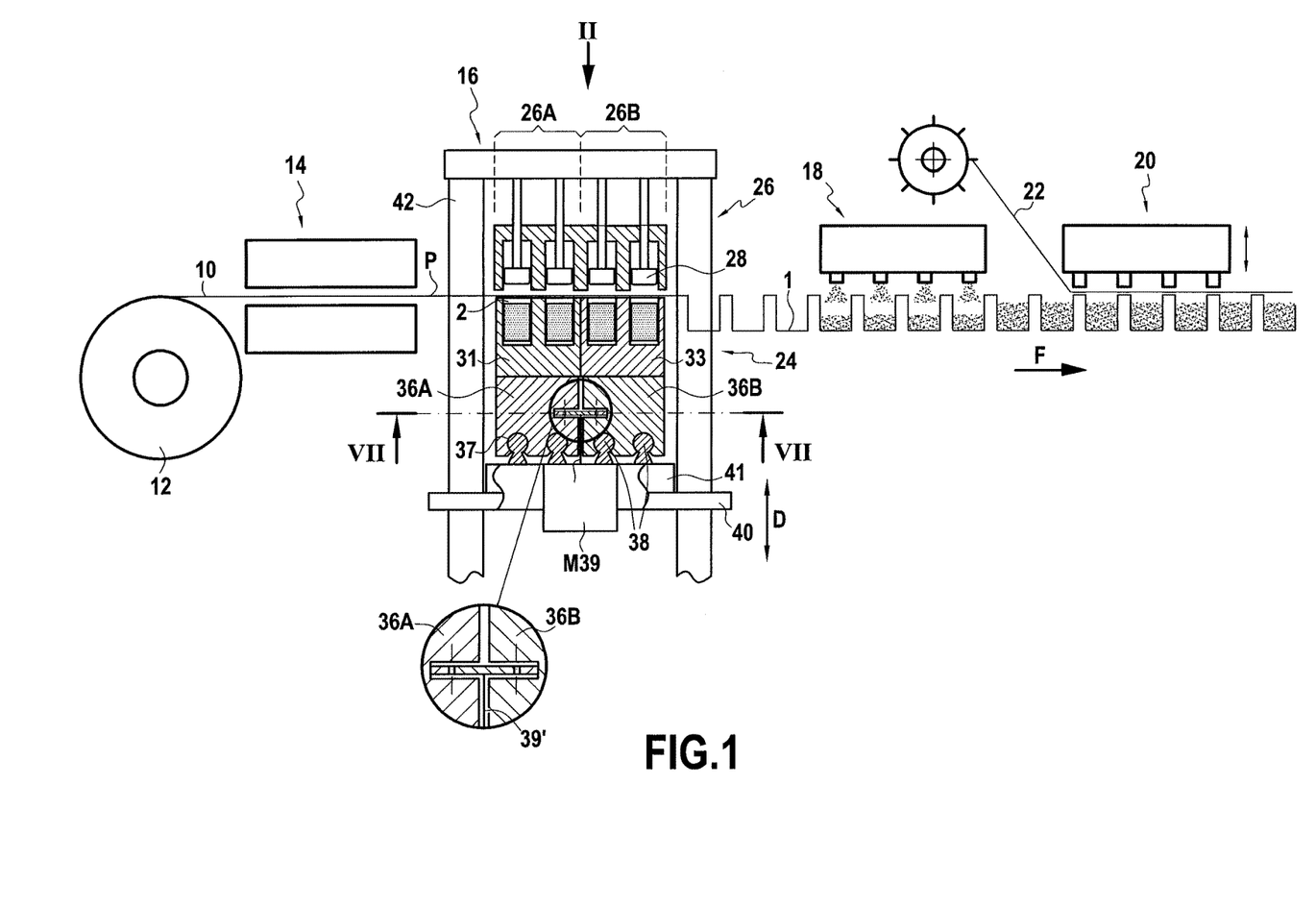
FIG. 1 is a diagrammatic side view of an installation implementing the device of the invention.

Firstly, a description is given of FIG. 1, which diagrammatically shows an installation using the device of the invention and implementing the method of the invention.

This installation includes a plurality of stations through which a band 10 of thermoplastic material is driven stepwise by any convenient drive system (not shown). In the installation shown by way of example, the containers are thermoformed from a thermoplastic material in the form of a band. Naturally, this band could be replaced by individual wafers or panels from which the containers could be thermoformed individually or in groups, such wafers or panels being, like the band, driven stepwise along the advance axis F.

Considered in succession in the advance direction in which the band advances along the advance axis F, the installation comprises a heater station 14, a thermoforming station 16, a filler station 18 for filling the thermoformed containers 1, and a closure station 20 for closing the containers 1, e.g. a sealing station for sealing a closure band 22 across the openings of the containers 1.

The thermoforming station 16 comprises a mold device 24 comprising a plurality of analogous mold blocks, as described below. The thermoforming station further comprises a counter-mold 26 that comprises thermoforming pistons 28 mounted to move into the thermoforming chambers 2 of the mold device so as to push the thermoplastic material previously heated in the heater station 14 into said thermoforming chambers. In this example, the advance axis F of the thermoplastic band is horizontal, the mold device 24 is disposed below the thermoplastic band, and the counter-mold 26 is disposed above said band. Thus, the pistons 28 move vertically up and down, downwards to push the thermoplastic material in, and upwards for coming out of the mold chambers. Naturally, it is possible to imagine another configuration, e.g. a reverse configuration, with the counter-mold disposed under the band and the mold device disposed above the band.

Figure 2:
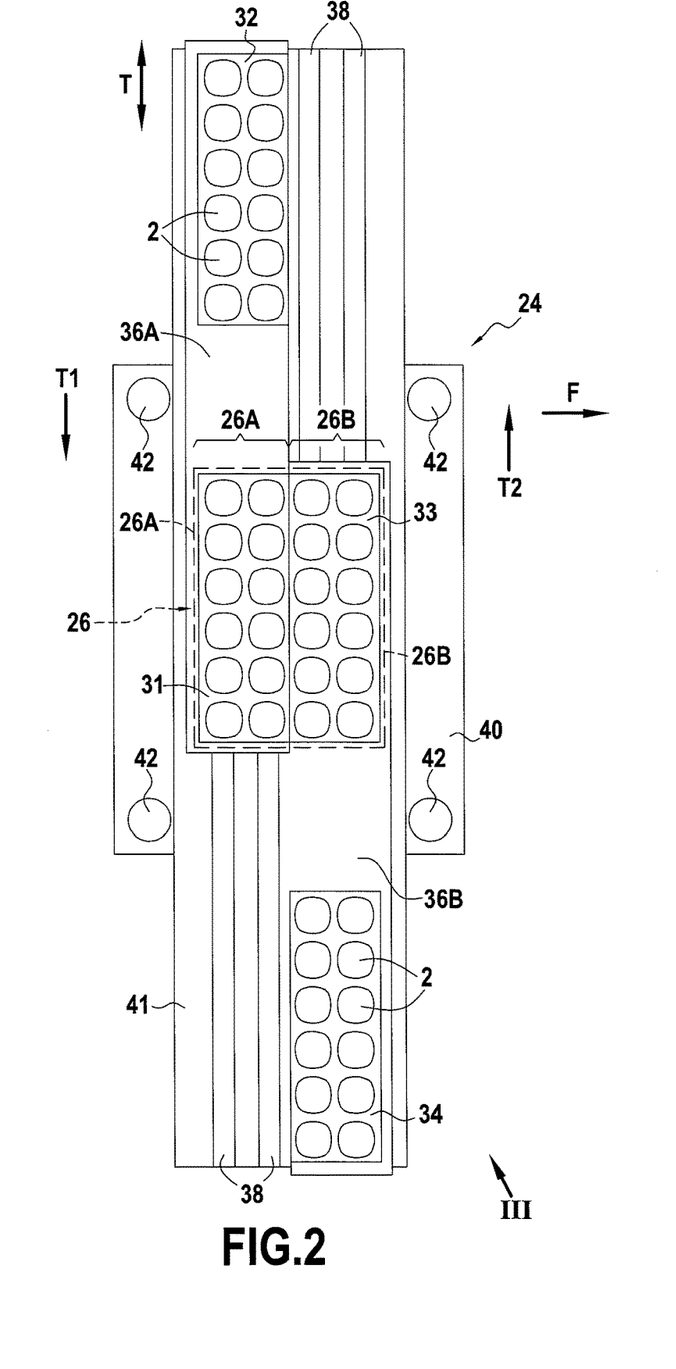
FIG. 2 is a fragmentary view from above, seen looking along arrow II of FIG. 1, showing the mold device.

There follows a description of FIG. 2, which is a diagram showing a mold device seen from above. It can be seen that this device comprises a first mold block 31, a second mold block 32, a third mold block 33, and a fourth mold block 34 that are analogous. Each of these mold blocks comprises an identical number of thermoforming chambers 2, disposed in the same manner. In this example, each mold block has two rows of thermoforming chambers that extend along the transverse axis T, the advance axis of the band being indicated by arrow F in FIG. 2. In this example, the transverse axis T is perpendicular to the advance axis F. The axes F and T define a horizontal plane P that is indicated in FIG. 1, that is the plane in which the band 10 advances in the thermoforming station 16, and that, in other words, is the thermoforming plane.

The device of the invention further comprises label insertion blocks, which are not shown in FIG. 2, and which are described below.

In FIG. 2, only the mold device is shown in uninterrupted lines, the position of the counter-mold 26 merely being indicated in dashed lines. FIG. 2 shows the mold device in a first configuration in which the first and third mold blocks 31 and 33 are in the thermoforming position, facing the counter-mold 26, while the second and fourth mold blocks 32, 34 are in the labeling position and are made accessible to the labeling blocks that are described below. It can be understood that, by moving the set formed by the first and second mold blocks 31, 32 along the transverse axis T in the direction indicated by arrow T1, and by moving the set formed by the third and fourth mold blocks 33 and 34 along the transverse axis T, in the direction indicated by arrow T2 opposite from the direction indicated by arrow T1, the situation is reversed so that the second and fourth mold blocks 32, 24 are then facing the counter-mold 26, and the first and third mold blocks 31 and 33 are then made accessible to the labeling blocks. This corresponds to a second configuration.

More precisely, although it can be shaped in one piece, the counter-mold 26 comprises two counter-mold portions, referenced respectively 26A and 26B, that are mutually parallel and that extend along the transverse axis T. In FIG. 2, the first mold 31 is facing the first portion 26A of the counter-mold, and the third mold block 33 is facing the second counter-mold portion 26B. By means of the above-mentioned movements in the directions T1 and T2, the second and fourth mold blocks 32 and 34 are placed facing respective ones of the counter-mold portions 26A and 26B. To sum up, each of the two sets formed by respective ones of the first and second mold blocks 31 and 32 and by the third and fourth mold blocks 33 and 34 is mounted to move back and forth in the directions T1 and T2 for placing respective ones of the mold blocks facing the counter-mold 26.

Figure 4A:
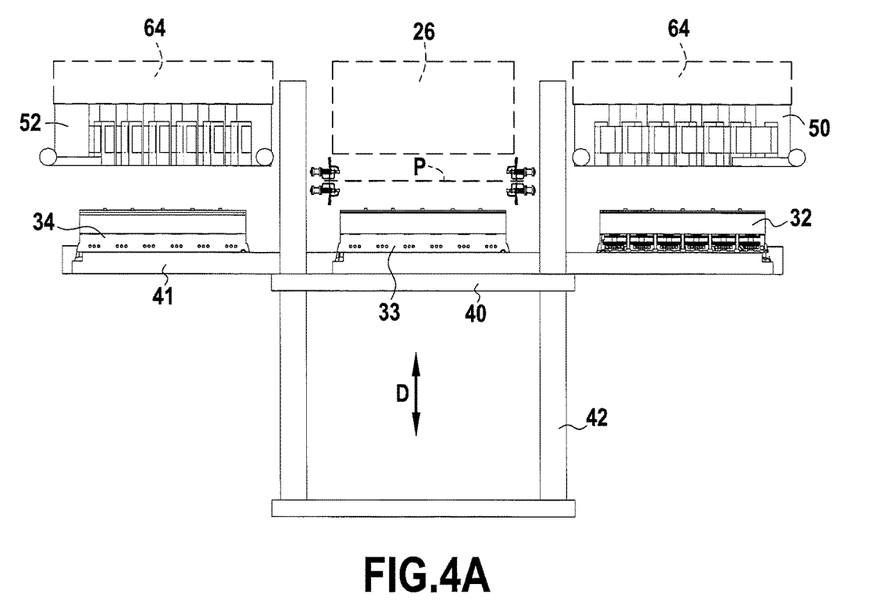
FIGS. 4A and 4B are two views seen looking along arrow IV of FIG. 3, showing the mold device and the labeling blocks, the device being at the disengagement level in FIG. 4A and at the thermoforming level in FIG. 4B.
Figure 4B:
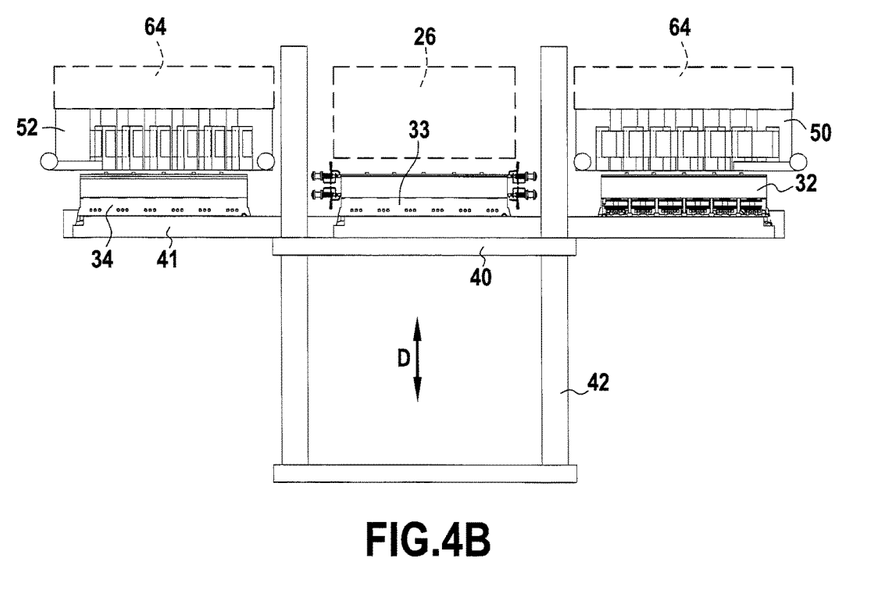

In FIGS. 1, 4A, and 4B, it can be understood that the mold blocks are also mounted to move back and forth as indicated by double-headed vertical arrow D between a thermoforming level (FIG. 4B), in which the mold blocks can co-operate with the counter-mold to thermoform containers from the band 10, and a disengagement level (FIG. 4A), in which the mold blocks are disengaged downwards so that the thermoformed containers come out of the chambers 2, and so that the band 10 is allowed to advance.

In the embodiment shown, the mold device comprises four analogous mold blocks. However, as indicated above, it could comprise only two analogous mold blocks forming a set aligned along the transverse axis T, e.g. the first and second mold blocks 31 and 32. In accordance with the invention, the set is moved as a whole along arrow D between the thermoforming level and the disengagement level, and is also moved as a whole back and forth in the directions indicated by arrows T1 and T2 so that the mold blocks are placed in the thermoforming position and in the labeling position in succession.

When, as shown, the mold device further comprises third and fourth mold blocks forming a second set analogous to the first set, then all four mold blocks are moved as a whole along arrow D between the thermoforming level and the disengagement level, while the first set comprising mold blocks 31 and 32 is also moved as a whole in the second movement that takes place back and forth as indicated by arrows T1 and T2, and while the second set formed of the blocks 33 and 34 is also moved as a whole, in phase opposition relative to the movement of the first set, in the directions indicated by arrows T1 and T2.

Figure 3:
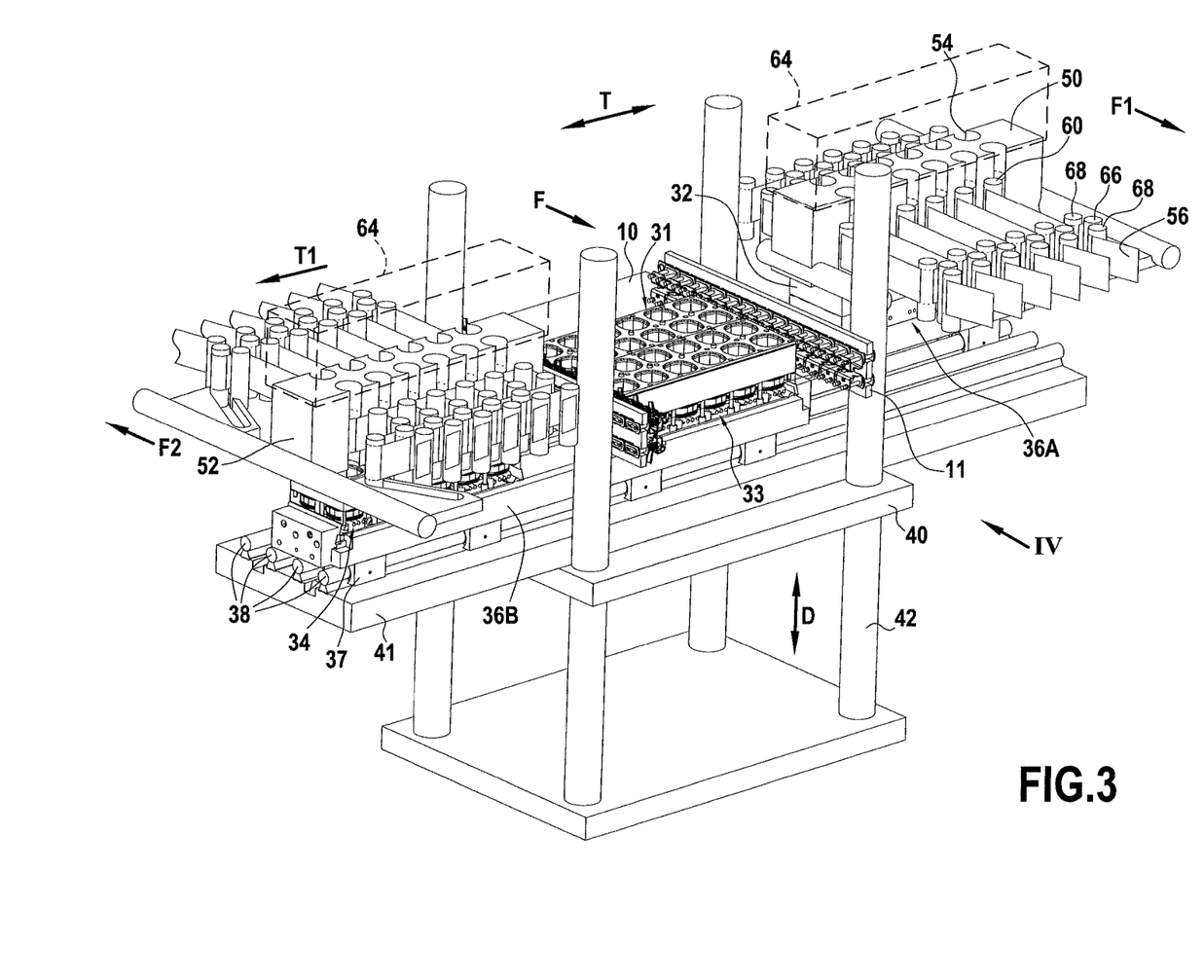
FIG. 3 is a perspective side view, seen looking along arrow III of FIG. 2, showing the mold device and the labeling blocks.

There follows a description of FIG. 3, which is a perspective view of the mold device, with the labeling blocks 50 and 52. It can be seen that the mold blocks 31 to 34 are disposed on a common support 40 that is mounted to move in translation as indicated by double-headed arrow D, perpendicularly to the thermoforming plane P and thus, in this example, vertically. This plane is embodied by the thermoplastic band 10 held over its edges by clamps 11 that cause it to advance stepwise. The movement as indicated by double-headed arrow D may be achieved by known systems and be guided by guide columns 42.

In addition, the mold blocks are carried by the common support 40 in a manner allowing the blocks to be caused to slide along the transverse axis T, i.e. in direction T1 or in direction T2. In this example, the first and second mold blocks 31 and 32 are disposed on a common base 36A, and the third and fourth mold blocks 33 and 34 are disposed on a common base 36B. As can also be seen in FIG. 3, these bases have guide shoes 37 with grooves extending along the axis T, which shoes co-operate with guide rails 38 carried by the common support 40, optionally via an elongate support 41, in turn carried by said common support. The mold blocks are arranged on the common support in such manner as to minimize the space between the faces of the mold blocks 31 & 32 that are parallel to the axis T and that face each other, and the space between the faces of the mold blocks 33 & 34 that are parallel to the axis T and that face each other. Thus, the two mold blocks 31 & 33 or 32 & 34 that are, respectively in the first configuration and in the second configuration, facing the counter-mold, form a consistent mold block, with small spaces between the thermoforming chambers, so as to avoid losses of thermoplastic material.

There follows a description of the labeling blocks 50 and 52. Each of these blocks has wrap-around shaping chambers 54 disposed in a manner analogous to the thermoforming chambers 2 of each of the mold blocks. Thus, when a mold block is situated facing a labeling block, the wrap-around shaping chambers are in register with the thermoforming chambers. For each labeling block, the wrap-around shaping chambers thus constitute label preparation and cutting zones for preparing and cutting labels. When the cut labels are put in place in these zones, and when a mold block (32 or 33 for the labeling block 50, or 31 or 34 for the mold block 52) is placed facing these preparation and cutting zones, the labels can be disposed in the thermoforming chambers that are then facing said zones.

Figure 5:
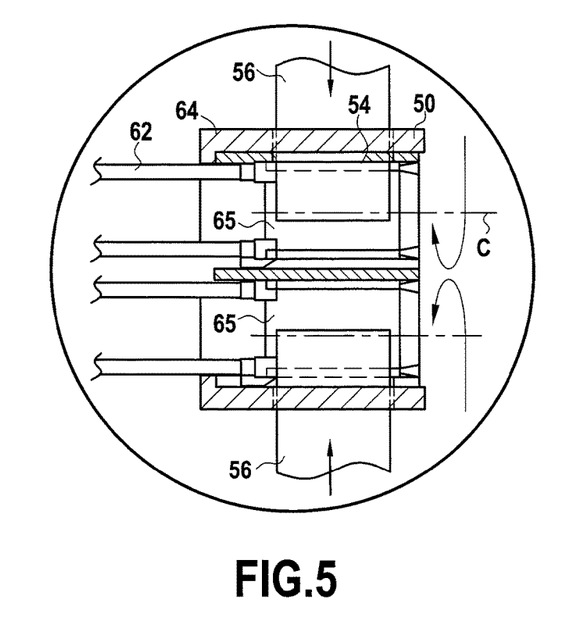
FIG. 5 is a fragmentary section view of a labeling block.

With reference to FIGS. 3 to 5, there follows a schematic description of how the labeling blocks are shaped, when the labels are implemented in the form of wrap-around labels that serve to surround the bodies of the containers. As indicated, each labeling block comprises wrap-around shaping chambers 54. Strips 56 are brought into the chambers (one per chamber), by being driven by drive pulleys 60 disposed in the vicinity of the side faces of the labeling blocks. Insofar as, in the example shown, each mold block comprises two rows of thermoforming chambers, each labeling block also comprises two rows of wrap-around shaping chambers open via respective slots in the two opposite side faces of each labeling block, so that the strips can be brought into the wrap-around shaping chambers of the two rows by the drive pulleys 60 adjacent to respective ones of said two opposite side faces. The wrap-around shaping chambers are thus readily accessible to the strips.

The labeling blocks 50 and 52 are also equipped with cutting blades (not shown) that, once the strips have been shaped into wrap-around shapes inside the chambers, cut off the strips against side faces of each of the blocks (50 and 52 (against the edges of the above-mentioned slots) so that the ends of the strips that are cut off to form wrap-around labels remain in the wrap-around shaping chambers. In a manner known per se, and as shown in FIG. 5 for the block 50, each labeling block further comprises pushers or the like 62 (which pushers can be disposed in pusher blocks 64 indicated in dashed lines in FIGS. 3, 4A, and 4B, and mounted to move up and down vertically so as to push the cut-off wrap-around labels into the thermoforming chambers. Optionally, shaper cores 65 may be disposed in the wrap-around shaping chamber 54, if necessary. In a manner known per se, the wrap-around labels can be held in the wrap-around shaping chambers by a small amount of suction, which can cease once the pushers 62 have pushed the wrap-around labels into the thermoforming chambers.

For bringing the strips 56 towards the wrap-around shaping chambers 54 tension pulleys that may be mounted to rotate freely may be used. In this example, for each wrap-around shaping chamber 54, one main tension pulley 66, and two secondary tension pulleys 68 are provided.

The labeling blocks 50 and 52 move back-and-forth parallel to the advance axis F of the thermoplastic band, as indicated by arrows F1 and F2. They move in opposite directions relative to each other, i.e. in phase opposition. When the block 50 is disposed facing the second mold block 32 in FIG. 3, said block moves in the direction F1 so as to come and be placed facing the third mold block 33 when, in the second configuration, said third mold block takes up the labeling position. Similarly, when the second labeling block 52 is facing the fourth mold block 34 in FIG. 3, it moves in the direction indicated by arrow F2 so as to come and be placed facing the first mold block 31 when said first mold block takes up its labeling position.

Figure 6A:
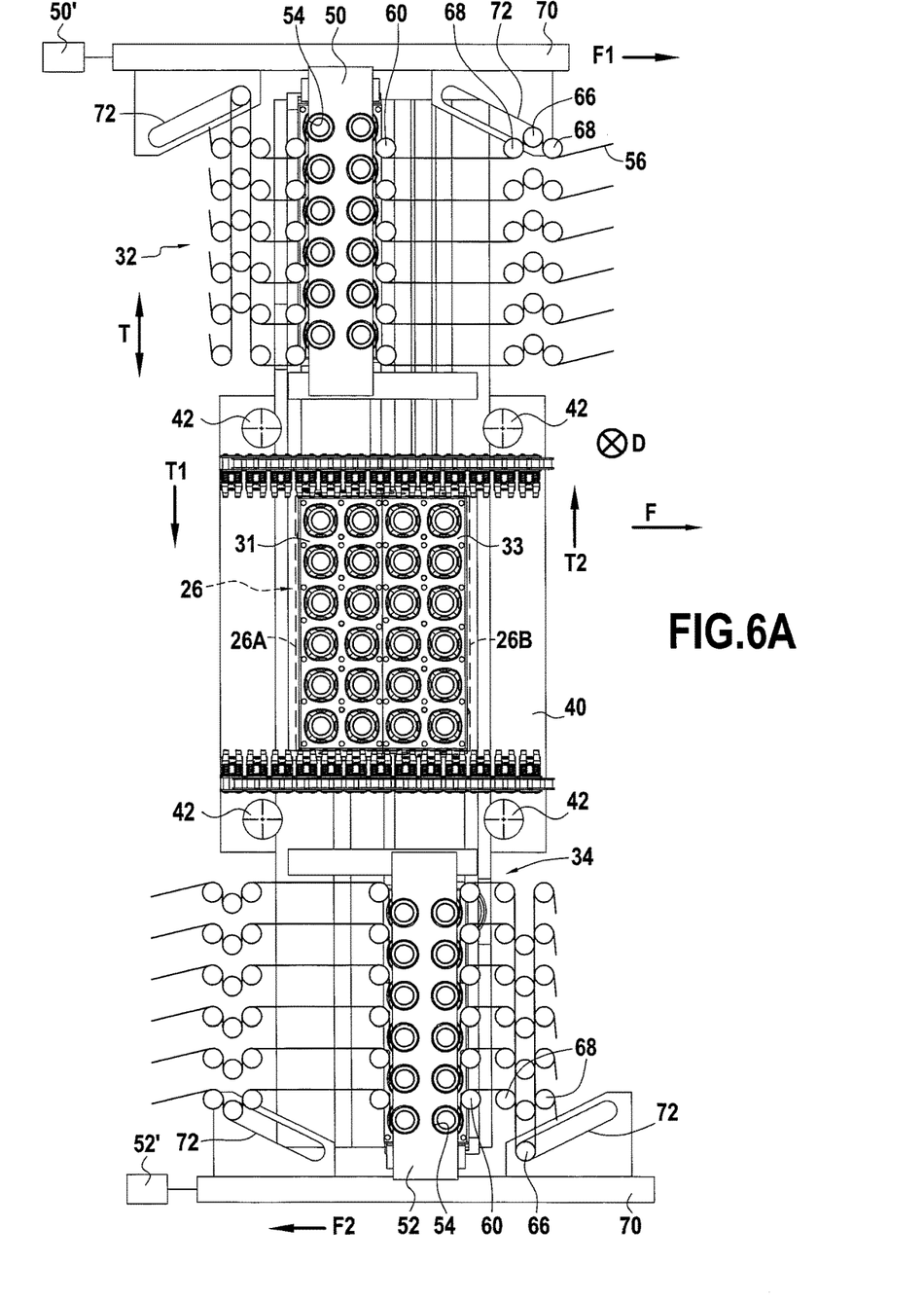
FIGS. 6A, 6B, and 6C are three views from above, showing the mold device and the labeling blocks in three successive stages.
Figure 6B:
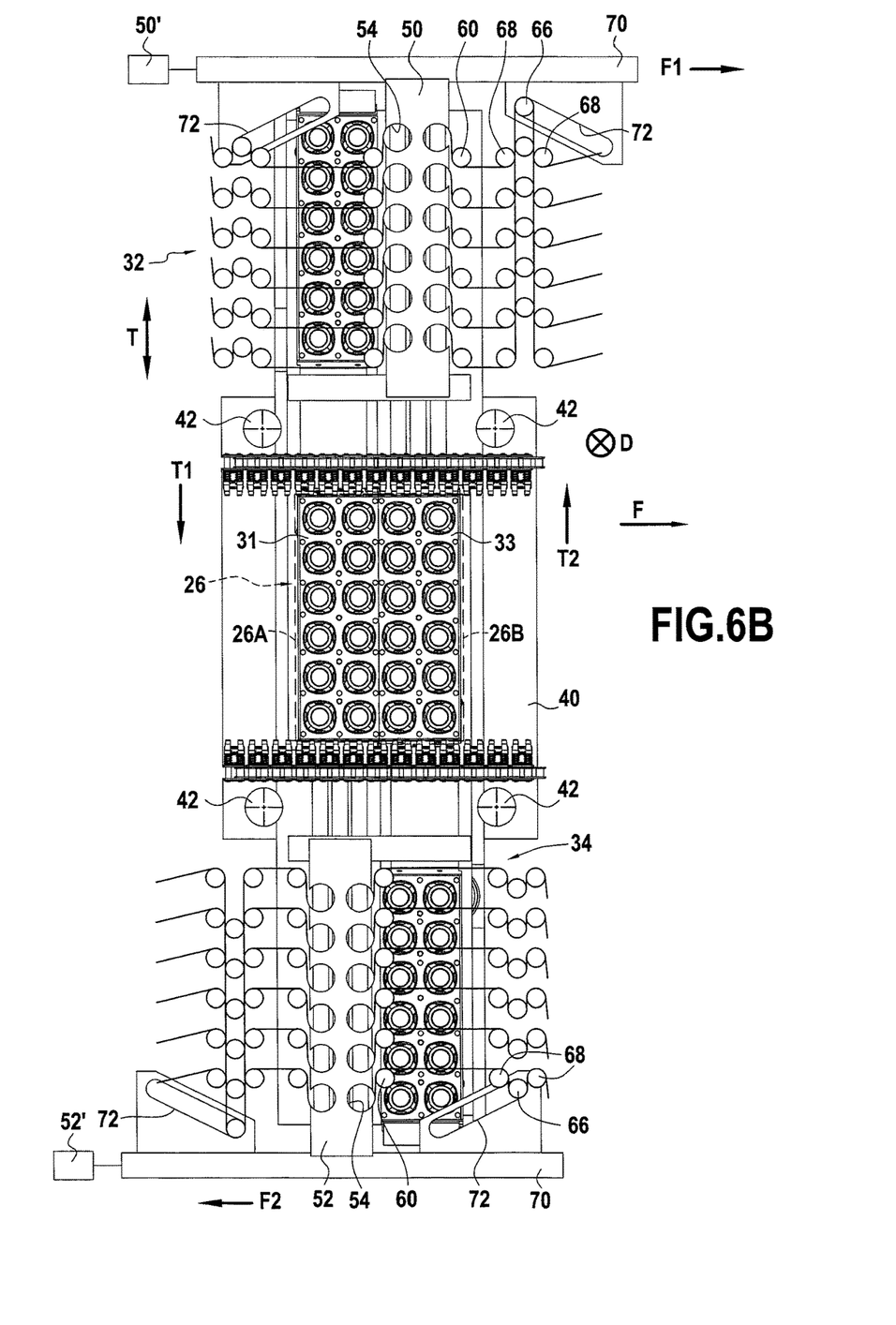
Figure 6C:
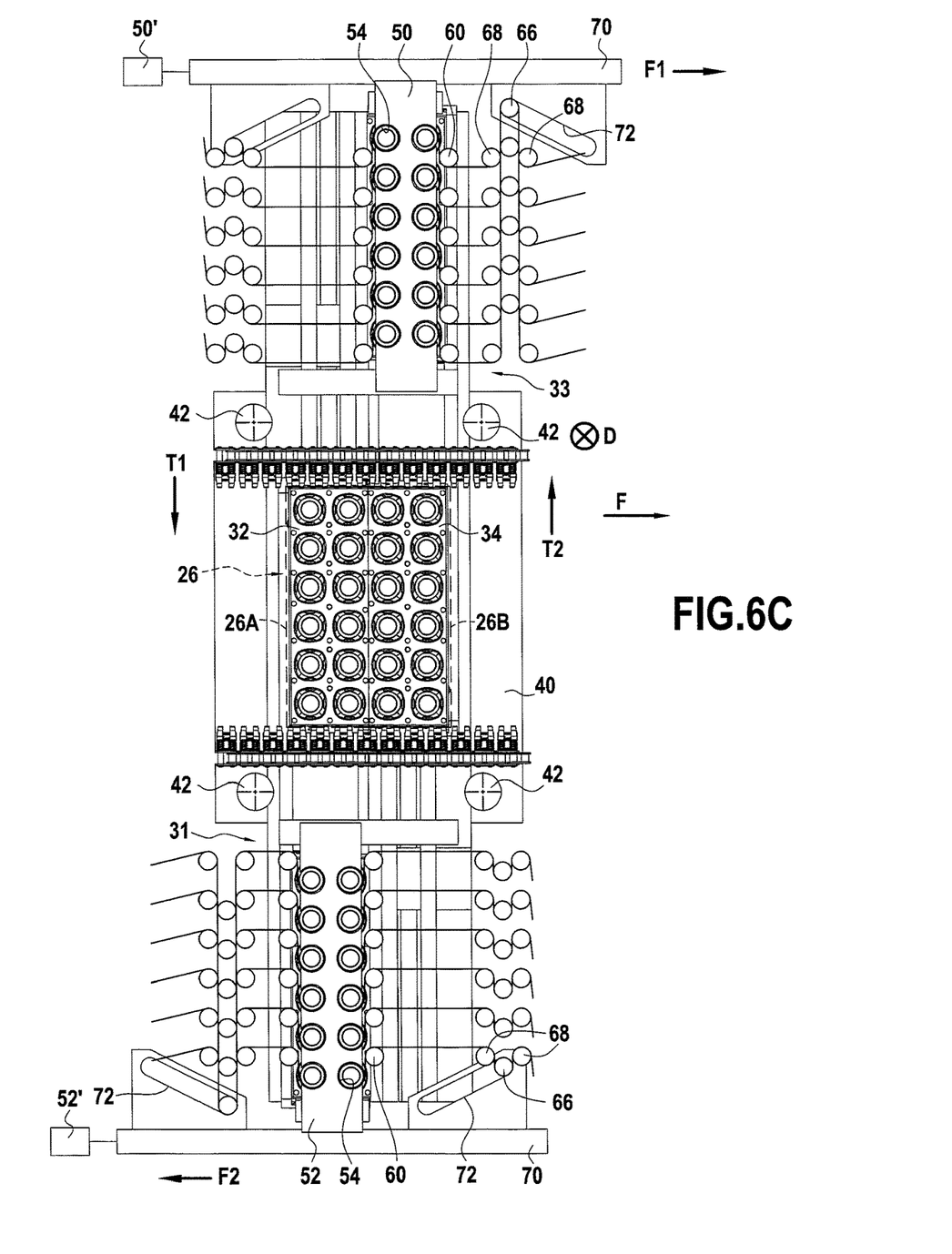

This can be better understood on the basis of FIGS. 6A to 6C, of which a description follows. In order to make the drawing simpler, the device for moving the labeling blocks is shown merely diagrammatically and is designated by the references 50' and 52'. This device may be of any known type, e.g. of the pusher or rack-and-pinion type.

In FIGS. 6A to 6C, reference D indicates the axis along which the first movement is made that all of the mold blocks 31 to 34 make together between the thermoforming level and the disengagement level, reference T indicates the axis along which the second movement is made that the mold blocks 31 and 32 make together, and that mold blocks 33 and 34 also make together, and reference F indicates the advance axis F along which the thermoplastic band advances through the installation, and along which the third movement of the labeling blocks 50 and 52 takes place, in the directions F1 and F2. In these figures, the position of the counter-mold 26 is also shown in dashed lines, and it can be seen that the labeling blocks 50 and 52 are disposed on either side of the counter-mold along the transverse axis T.

The counter-mold portions 26A and 26B are also shown in dashed lines, even though, as indicated, these portions may be formed in one piece in the counter-mold 26.

FIG. 6A shows the first configuration of the mold blocks. It can be seen that the first mold block 31 is in the thermoforming position facing the first counter-mold portion 26A, that the second mold block 32 is in the labeling position facing the first labeling block 50, that the third mold block 33 is in the thermoforming position facing the second counter-mold portion 26B, and that the fourth mold block 34 is in the labeling position facing the second labeling block 52. In this first configuration, when the mold blocks are at the thermoforming level, containers can be thermoformed in the thermoforming chambers of the first and third mold blocks 31 and 33 and, simultaneously, wrap-around labels can be put in place in the thermoforming chambers of the mold blocks 32 and 34, by respective ones of the labeling blocks 50 and 52. The decorative wrap-around labels are thus put in place in the thermoforming chambers while making use of the time taken for thermoforming, while the mold blocks are at the thermoforming level. Once the thermoforming has been performed in mold blocks 31 and 33, and once the labels have been put in place in mold blocks 32 and 24, all of the mold blocks can be lowered to the disengagement level. This then makes it possible for the thermoformed containers to come out of the mold blocks 31 and 33, so that the band of thermoplastic material can advance by one step.

FIG. 6B shows the situation at the beginning of the movement for lowering the mold blocks towards the disengagement level. At this time, mold blocks 31 and 33 are still in their thermoforming position, and mold blocks 32 and 34 are still in their labeling positions, but the time taken by the lowering is put to advantageous use for moving the labeling blocks. The labeling block 50 is moved in the direction indicated by arrow F1 to come to a waiting position above the position that the third mold block 33 takes up once it has been put into the labeling position, while, simultaneously, the second labeling block 52 is moved in the direction indicated by arrow F2 to come into a waiting position above the position that the first mold block 31 takes up once it has reached its labeling position.

FIG. 6C shows the situation once the mold blocks have reached the disengagement level. At that time, the containers that have just been thermoformed come out of the thermoforming chambers, and the mold blocks can then be moved in translation along the transverse axis T. It can thus be seen that the first and second mold blocks 31 and 32 have been moved in the direction T1 so as to take up respectively their label position and their thermoforming position, and, similarly, the third and fourth mold blocks have been moved in the direction indicated by arrow T2 to come respectively to take up their labeling position and their thermoforming position. During this stage in which the mold blocks are moved in translation in the second movement, in the directions T1 and T2, the thermoplastic band can be caused to advance by one step, since the mold blocks are then at the disengagement level, and the wrap-around labels can also be prepared in the wrap-around shaping chambers of the labeling blocks 50 and 52, since said blocks have already been in place since the stage shown in FIG. 6B. Time is thus saved because the time taken by one operation is put to good use for performing another operation simultaneously, and, in the situation of the second configuration shown in FIG. 6C, the mold blocks are ready to be brought to the thermoforming level, so as to thermoform the containers in mold blocks 32 and 34, while putting the wrap-around labels in place in mold blocks 31 and 33.

At the end of these operations, operations continue as described above, but with opposite movement directions, i.e.:

the mold blocks are brought to the disengagement level, while also moving the insertion blocks 50 and 52 respectively in direction F2 for block 50 and in direction F1 for block 52, in order for them to be in their waiting positions as shown in FIG. 6A;

mold blocks 31 and 32 are then moved in translation in direction T2 and mold blocks 33 and 34 are moved in translation in direction T1 while also preparing the wrap-around labels in the labeling blocks 50 and 52; and the mold blocks are brought back to the thermoforming level, and the situation shown in FIG. 6A is returned to.

Thus, as indicated, the device for causing the labeling blocks 50 and 52 to move is shown diagrammatically and is referred to by references 50' and 52'. It should also be noted that the labeling blocks 50 and 52 are secured to bars 70 carrying cams 72, e.g. formed by the edges of slots that are inclined relative to the advance axis F of the band. Considered in the plane defined by the axes F and T, said slots are slanting. As indicated above, the wrap-around labels are cut off from the ends of strips 56 brought into the wrap-around shaping chambers 54 of the blocks 50 and 52. It is also indicated above that, for each wrap-around shaping chamber, the strips are driven using at least one drive pulley 60 and at least one tension pulley, and, in this example, one main tension pulley 66, and two secondary tension pulleys 68. In this example, the pulleys have axles about which they rotate that are parallel to the axis D, the planes of the strips extending parallel to said axis. The drive pulleys 60 are driving pulleys and they move with the labeling blocks 50 and 52. Conversely, the secondary tension pulleys 68 do not move while the insertion blocks are moving, their axles about which they rotate being stationary. The pulleys 66, which are the main tension pulleys, move while being guided in their movement by the above-mentioned cams 72. Naturally, it suffices to provide one cam for each row of pulleys 66 for co-operating with the various strips feeding the same row of wrap-around shaping chambers. For this purpose, it suffices for the drive shafts for driving these pulleys to be interconnected via a common link, e.g. a horizontal bar, and for only one of the pulleys, namely the head pulley the furthest away from the counter-mold in this example, to co-operate directly with said cams. The pulleys of each of the various rows of pulleys 66 and 68 have their axles in line vertically, these axles not moving along the advance axis of the band. Thus, when the labeling block 50 moves in the direction indicated by arrow F1 of FIG. 6A, the pulleys 66 situated on the side of the block 50 that is the front side in the advance direction are moved away from the pulleys 68 by means of the cams 72, so as to maintain the tension of the strips 56 even though the labeling block 50 is moving closer to said pulleys 66 and 68. Conversely, on the other side of said block, the pulleys 66 are moved closer to the pulleys 68 so as also to maintain the same length of strip between these pulleys and the rear side of the block 50. The same phenomenon also applies for the block 52, and in the other movement direction.

The labeling blocks are described in a particular situation in which the labels are formed by wrap-around labels cut off from the ends of decorative strips, and shaped into wrap-around shapes in wrap-around shaping chambers, the resulting wrap-around labels being put in place in the thermoforming chambers so that they adhere naturally to the walls of the containers under the effect of the thermoforming that is then performed. However, it is possible to use other types of label to be put in place in the thermoforming chambers before the containers are thermoformed. In particular, they could be labels that are designed to be affixed against a portion only of the side wall of each of the containers, that are also cut off from strips, but that are shaped in means other than wrap-around shaping chambers, and optionally brought in by means other than mere pushers, or indeed bottom labels, e.g. of the type described in European Patent Application No 2 117 809. It should be understood that, as indicated in that European Patent Application No. 2 117 809, such bottom labels may also coexist with wrap-around labels.

In FIGS. 4A and 4B, dashed lines are used to indicate the position of the counter-mold 26. It can be seen that the labeling blocks 50 and 52 are placed substantially at the same level as the counter-mold relative to the thermoforming plane P. The level may be very slightly different, but the advantage of this positioning is that the labels can be put in place in the mold blocks at the same time as the thermoforming is being performed. In general, it is advantageous for the labeling blocks 50 and 52 to be placed on the same side of the thermoforming plane P as the counter-mold 26.

Figure 7:
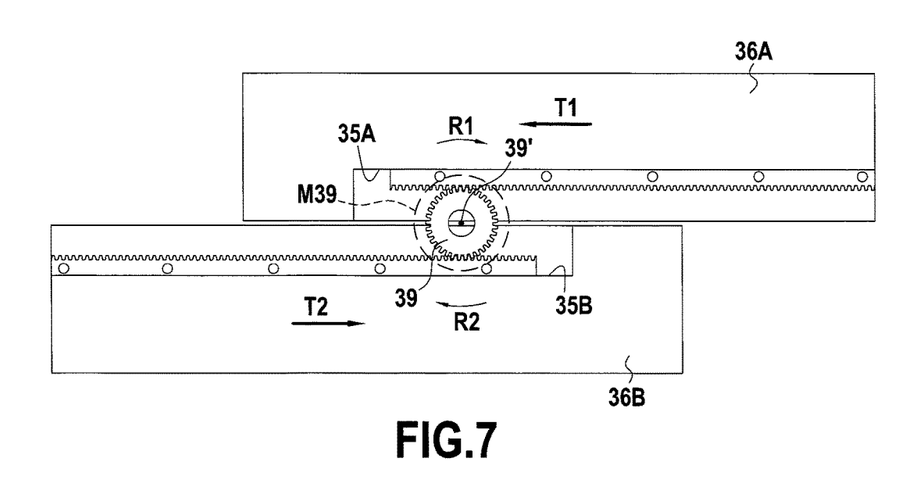
FIG. 7 is a diagrammatic section view in plane VII of FIG. 1, showing a possibility for the drive system for driving the mold blocks in the second movement.

There follows a description of FIG. 7, which is a diagrammatic section view on plane VII of FIG. 1. This section view is thus taken through the bases of the mold blocks 36A and 36B, above or alongside the shoes 37 serving to guide them in translation along the transverse axis. In the section shown in FIG. 7, cavities, respectively 35A and 35B, can be seen. In each of these cavities, a respective rack is provided that has its teeth facing the other base of the mold block. A driving pinion 39, driven in rotation by the shaft 39' of a motor 39 (see FIG. 1) is situated in a space formed by the facing portions of these cavities 35A and 35B. Teeth on the pinion co-operate with teeth on the racks, and it can be understood that the pinion rotating in the direction R1 or in the direction R2 causes the mold blocks to move in translation back and forth in the directions T1 and T2. Naturally, this is merely an example of how the mold blocks are driven back and forth.

The invention claimed is:

1. A device for manufacturing, by thermoforming, containers provided with decorative labels, the device comprising:
   a mold device comprising at least first and second analogous mold blocks;
   a counter-mold, a thermoplastic material being caused to advance along an advance axis and to face the counter-mold in a thermoforming plane defined by the advance axis and by a transverse axis; and
   two labeling blocks;
   the mold device being placed on the other side of the thermoforming plane relative to the counter-mold, and being configured so that the mold blocks can, in succession, take up a first configuration in which the first mold block is in a thermoforming position facing the counter-mold while the second mold block is in a labeling position facing one of the labeling blocks, and a second configuration in which the second mold block is in the thermoforming position, while the first mold block is in a labeling position facing the other of the labeling blocks;
   the labeling blocks being disposed on either side of the counter-mold along the transverse axis, and the first and second mold blocks forming a set suitable for being moved in a first movement perpendicularly to the thermoforming plane between a thermoforming level close to said plane and a disengagement level spaced apart from said plane, and in a second movement along the transverse axis so as to place the mold blocks facing in succession the counter-mold and one of the labeling blocks.

2. A device according to claim 1, wherein the mold device further comprises third and fourth analogous mold blocks forming a set parallel to the set formed by the first and second mold blocks, the counter-mold having two parallel counter-mold portions, each of which corresponds to a mold block, and the first, second, third, and fourth mold blocks being suitable for being moved together in the first movement and for being moved simultaneously during the second movement, said second movement being made in opposite directions for the set formed by the first and second mold blocks and for the set formed by the third and fourth mold blocks.

3. A device according to claim 2, wherein the labeling blocks are suitable for being moved in a third movement parallel to the advance axis in synchronization with the movements of the mold blocks, in such a manner as to be alternately in alignment with the first counter-mold portion and in alignment with the second counter-mold portion.

4. A device according to claim 3, configured to move the labeling blocks in the third movement during the first movement of the mold blocks from the thermoforming level to the disengagement level.

5. A device according to claim 3, wherein each labeling block comprises label preparation and cutting zones for receiving labels cut off from strips brought into said zones, and, for each strip, the device further comprises at least one drive pulley for bringing the end of the strip into a label preparation and cutting zone, and at least one tension pulley for putting the strip under tension, and the device is configured so that, while the labeling block is moving in the third movement, the drive pulley moves with the labeling block, and the tension pulley and the drive pulley move relative to each other.

6. A device according to claim 5, wherein the tension pulley co-operates with a cam.

7. A device according to claim 2, wherein, when the mold blocks are in the first configuration, the first mold block is in the thermoforming position facing the first counter-mold portion, the second mold block is in the labeling position facing the first labeling block, the third mold block is in the thermoforming position facing the second counter-mold portion and the fourth mold block is in the labeling position facing the second labeling block, while, when the mold blocks are in the second configuration, the first mold block is in the labeling position facing the second labeling block, the second mold block is in the thermoforming position facing the first counter-mold portion, the third mold block is in the labeling position facing the first labeling block, and the fourth mold block is in the thermoforming position facing the second counter-mold portion.

8. A device according to claim 2, wherein each mold block has two rows of thermoforming chambers extending along the transverse axis, and each labeling block has two corresponding rows of zones for putting labels in place.

9. A device according to claim 1, wherein each mold block has two rows of thermoforming chambers extending along the transverse axis, and each labeling block has two corresponding rows of zones for putting labels in place.

10. A device according to claim 1, further comprising a common support mounted to move in translation perpendicularly to the thermoforming plane, the mold blocks being carried by the common support in a manner allowing said blocks to be caused to slide along the transverse axis.

11. A device according to claim 1, wherein the labeling blocks are placed substantially at the same level as the counter-mold relative to the thermoforming plane.

12. A device according to claim 1, wherein the labeling blocks are placed substantially on the same side as the counter-mold relative to the thermoforming plane.

13. A method of manufacturing, by thermoforming, containers provided with decorative labels, the method comprising the following steps:

causing a thermoplastic material to advance along an advance axis, and bringing the thermoplastic material to face a counter-mold in a thermoforming plane defined by the advance axis and by a transverse axis;

causing two analogous mold blocks of a mold device placed on the other side of the thermoforming plane relative to the counter-mold to be placed, in succession, in a first configuration in which the first mold block is in a thermoforming position facing the counter-mold while the second mold block is in a labeling position facing a labeling block, and in a second configuration in which the second mold block is in the thermoforming position, while the first mold block is in a labeling position facing another labeling block;

with the labeling blocks being disposed on either side of the counter-mold along the transverse axis, going from one of the first and second configurations to the other is achieved by moving the first and second mold blocks together in a first movement perpendicularly to the thermoforming plane between a thermoforming level close to said plane and a disengagement level spaced apart from said plane, and in a second movement along the transverse axis so as to place the mold blocks facing in succession the counter-mold and one of the labeling blocks.

14. A method according to claim 13, wherein, with the counter-mold having two counter-mold portions, each of which corresponds to a respective mold block, the first movement is made by moving the first and second mold blocks together with third and fourth analogous mold blocks to bring all four mold blocks together to the thermoforming level or to the disengagement level, and the second movement is made by moving the first and second mold blocks together in one direction and by moving the third and fourth mold blocks together in the opposite direction.

15. A method according to claim 14, wherein the labeling blocks are moved in a third movement parallel to the advance axis, so that each labeling block finds itself, in succession, in alignment with one or the other of the counter-mold portions.

16. A method according to claim 15, wherein labels are put in place in the mold blocks situated facing the labeling blocks at the same time as the thermoforming is being performed in the mold blocks situated facing the counter-mold while all four mold blocks are at the thermoforming level, and the labeling blocks are moved in the third movement while the four mold blocks are being moved in the first movement, from the thermoforming level towards the disengagement level.

17. A method according to claim 14, wherein, when the mold blocks are in the first configuration, containers are thermoformed in the first and third mold blocks in the thermoforming position facing respective ones of the first and second counter-mold portions, and labels are put in place in the second and fourth mold blocks facing respective ones of the first and second labeling blocks, while, when the mold blocks are in the second configuration, containers are thermoformed in the second and fourth mold blocks in the thermoforming position facing respective ones of the first and second counter-mold portions, and labels are put in place in the first and third mold blocks facing respective ones of the second and first labeling blocks.

18. A method according to claim 13, wherein, with each mold block having two rows of thermoforming chambers extending along the transverse axis, and with each labeling block having two corresponding rows of label preparation zones, the thermoforming of the containers in the chambers of the mold blocks situated facing the counter-mold is performed simultaneously with putting labels in place in the chambers of the mold blocks situated facing the label preparation zones, while the mold blocks are at the thermoforming level.

19. A method according to claim 13, wherein the ends of strips are brought to and cut off in label preparation and cutting zones of the labeling blocks so as to form labels in said zones and, while the labeling blocks are moving in the third movement, the tension of the strips is maintained by means of tension pulleys that are moved relative to said blocks.

20. A method according to claim 19, wherein the ends of the strips are brought to the label preparation and cutting zones of each labeling block by using, for each strip, at least one drive pulley and at least one tension pulley and, while the labeling block is being moved in the third movement, the drive pulley and the tension pulley are moved relative to each other.

* * * * *